Patented Oct. 11, 1949

2,484,528

UNITED STATES PATENT OFFICE 2,484,528

FLUOROMETHYLTRIAZINES

George W. Rigby, Brandywine Hundred, Del., assignor to E. I. du Pont de Nemours & Company, Wilmington, Del., a corporation of Delaware No Drawing. Application May 15, 1945, Serial No. 593,965

6 Claims. (Cl. 260—248)

This invention relates to the preparation of fluorinated organic compounds and to new organic fluorine compounds. More particularly, this invention relates to fluoromethyl triazines and a process for the preparation of these compounds.

This application is a continuation in part of copending application Serial No. 484,302, filed April 23, 1943, now Patent No. 2,409,315, by myself and Herman E. Schroeder.

This invention has as an object a new class of chemical compounds, namely 2,4,6-tris-(fluoromethyl) triazines. A further object is 2,4,6-tris-(monofluoromonochloromethyl) triazine. A still further object is 2,4,6-tris-(difluoromethyl) triazine. A still further object is the provision of a process for obtaining said fluoromethyl triazines. Additional objects will become apparent from an examination of the following description and claims.

These and other objects and advantages are accomplished according to the herein described invention, which comprises reacting ammonia with a polyfluoroethylene containing at least three fluorine atoms. The prefix (poly) as used herein and in the appended claims refers to the number of fluorine atoms present in the fluoroethylene and not to polymeric materials.

The reaction of this invention may be illustrated by the following equation:

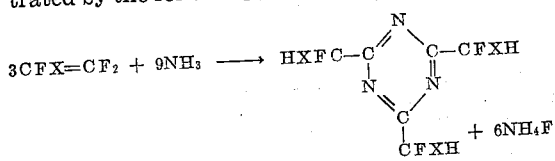

$3CFX=CF_2 + 9NH_3 \longrightarrow$ HXFC-C ... C-CFXH ... CFXH $+ 6NH_4F$ wherein X is a member of the group consisting of hydrogen and halogen atoms.

The following examples, in which proportions are in parts by weight unless otherwise specified, are given for illustrative purposes and are not intended to place any restrictions on the herein described invention.

Example I

A stainless steel high-pressure reactor was swept with nitrogen and charged with 0.5 part of cupric acetate, closed, and then charged with 75 parts of anhydrous ammonia and 35 parts of tetrafluoroethylene. The tube was placed in a shaking machine at room temperature and allowed to remain there for six hours. The unreacted gases were bled off, the reactor opened and the organic products were separated from the ammonium fluoride, which was formed in the reaction, by extraction with ether. The ether extract was fractionally distilled to recover 22 g. of 2,4,6-tris-(difluoromethyl) triazine which boiled at 72°–73° C./9 mm. Calc'd. for $(CF_2HCN)_3$: N, 18.2%; F, 49.4%; molecular weight, 231; molecular refractivity, 35.6. Found: N, 17.9%; F, 47.0%; molecular weight, 213; molecular refractivity, 35.1.

Upon hydrolysis of the 2,4,6-tris-(difluoromethyl) triazine in neutral, acid or alkaline aqueous solution, difluoroacetic acid was obtained.

Example II

A silver-lined high-pressure reactor was swept with nitrogen and charged with 0.2 part of cupric acetate and 72 parts of anhydrous ether. The tube was closed, chilled, evacuated and further charged with 25 parts of anhydrous ammonia and 58 parts of chlorotrifluoroethylene. The reactor was allowed to warm gradually from about −90° C. to room temperature with occasional shaking. After four hours or when the reactor had warmed to room temperature, the reactor was opened and the product discharged. Fractionation of the resultant product yielded 5.5 parts of 2,4,6-tris-(chlorofluoromethyl) triazine boiling at 95°–96° C. at 3 mm. Calc'd. for $(CHClFCN)_3$: N, 15.0%; F, 20.3%; C, 25.7%. Found: N, 14.3%; F, 21.6%; C, 26.5%.

While the process of this invention has been illustrated with particular reference to the reaction of ammonia with tetrafluoroethylene and chlorotrifluoroethylene, it is to be understood that it is broadly applicable to all polyfluoroethylenes containing at least three fluorine atoms, i. e., to all compounds having the general formula $CF_2=CFX$, wherein X is a member of the group consisting of hydrogen and halogen atoms. Included among examples of said polyfluoroethylenes are: trifluorobromoethylene, trifluoroethylene, trifluorochloroethylene and tetrafluoroethylene. The tetrahaloethylenes react more readily than trifluoroethylene and tetrafluoroethylene is particularly preferred as it reacts the most readily.

The method of carrying out the reaction may vary to some extent with the different polyfluoroethylenes, but the usual procedure consists in charging the polyfluoroethylene and ammonia under anhydrous conditions into the reactor and permitting the reaction to take place at temperatures below 100° C. At higher temperatures the reaction proceeds vigorously and may result in explosion. In general, temperatures within the range of —30° C. to 50° C. are employed. It is preferable to carry out the reaction in the presence of a material, such as cupric acetate which moderates the reaction, thus preventing the reaction taking place with explosive violence. However, the presence of cupric acetate is not necessary to obtain the fluoromethyl triazines of this invention. It is desirable to carry out the reaction under anhydrous conditions since, in the presence of water, the triazine may hydrolyze to form the fluoroacetic acid as indicated in Example I.

It is usually desirable to use a molar excess of ammonia rather than the more expensive fluoroethylene. With the more reactive fluoroethylenes, such as tetrafluoroethylene, it is often desirable to employ an organic solvent, such as diethyl ether, dioxane or benzene.

The novel products of this invention are 2,4,6-tris-(fluoromethyl)triazines, i. e., compounds having the general formula:

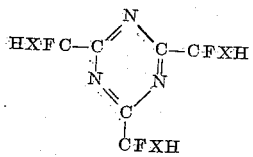

wherein X is a member of the group consisting of hydrogen and halogen atoms. Included among specific examples of said products are: 2,4,6-tris-(monofluoromonobromomethyl) triazine, 2,4,6-tris-(monofluoromethyl)triazine, 2,4,6-tris-(monofluoromonochloromethyl)triazine and 2,4,6-tris-(difluoromethyl) triazine.

The products of this invention are useful for various commercial purposes such as pharmaceuticals, plasticizers, bactericides and dielectrics. The products can be hydrolyzed to yield fluoroacetic acids which are useful as intermediates in organic syntheses.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. A 2,4,6-tris-(fluoromethyl)triazine having the general formula

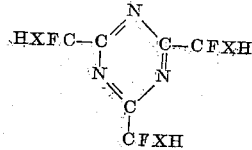

wherein X is a member of the group consisting of hydrogen, chlorine, bromine and fluorine atoms.

2. The chemical compound 2,4,6-tris-(difluoromethyl) triazine having the formula

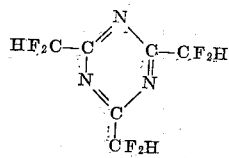

3. The chemical compound 2,4,6-tris-(monochloromonofluoromethyl) triazine having the formula

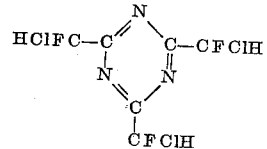

4. The process for obtaining a 2,4,6-tris-(fluoromethyl) triazine having the general formula

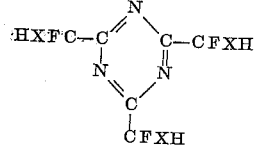

wherein X is a member of the group consisting of hydrogen, chlorine, bromine and fluorine atoms, which comprises reacting ammonia under substantially anhydrous conditions and at a temperature within the range of from —30° C. to 100° C. with a polyfluoroethylene containing at least three fluorine atoms having the general formula $CF_2=CFX$ wherein X is a member of the group consisting of hydrogen, chlorine, bromine and fluorine atoms, and recovering therefrom the so-formed triazine.

5. The process for obtaining 2,4,6-tris-(difluoromethyl) triazine having the formula

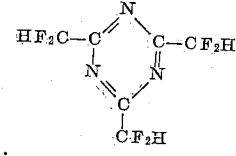

which comprises reacting ammonia with trifluoroethylene by contacting said ammonia with said trifluoroethylene under substantially anhydrous conditions at a temperature within the range of from —30° C. to 50° C., and recovering therefrom the so-formed triazine.

6. The process for obtaining 2,4,6-tris-(monochloromonofluoromethyl) triazine having the formula

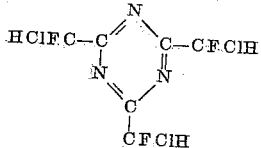

which comprises reacting ammonia with monochlorotrifluoroethylene by contacting said ammonia with said monochlorotrifluoroethylene under substantially anhydrous conditions at a temperature within the range of from —30° C. to 50° C. and recovering therefrom the so-formed triazine.

GEORGE W. RIGBY.

REFERENCES CITED

The following references are of record in the file of this patent:

FOREIGN PATENTS

| Number | Country | Date |
|---|---|---|
| 682,391 | Germany | 1939 |
| 699,493 | Germany | 1940 |
| 117,464 | Australia | Sept. 1, 1943 |